United States Patent [19]

Owsen

[11] Patent Number: 5,240,267
[45] Date of Patent: Aug. 31, 1993

[54] TRICYCLE

[76] Inventor: Peter Owsen, 18831 Bainbridge Ct., Livonia, Mich. 48152

[21] Appl. No.: 763,334

[22] Filed: Sep. 20, 1991

[51] Int. Cl.$^5$ .............................................. B62K 5/02
[52] U.S. Cl. .................................... 280/240; 280/261; 280/287; 280/282; 280/259; 280/112.2
[58] Field of Search ............... 280/282, 259, 266, 772, 280/263, 230, 261, 240, 287

[56] References Cited

U.S. PATENT DOCUMENTS

| | | | |
|---|---|---|---|
| 3,311,388 | 3/1967 | Ryan et al. | 280/282 X |
| 3,583,727 | 6/1971 | Wallis | 280/112.2 X |
| 3,698,502 | 10/1972 | Patin | 280/282 X |
| 4,432,561 | 2/1984 | Feikema et al. | 280/282 |
| 4,540,192 | 9/1985 | Shelton | 280/282 |
| 4,789,173 | 12/1988 | Lofgren et al. | 280/282 X |
| 4,799,704 | 1/1989 | Colarusso | 280/282 X |

FOREIGN PATENT DOCUMENTS

| | | | |
|---|---|---|---|
| 1298013 | 6/1969 | Fed. Rep. of Germany | 280/282 |
| 2628055 | 9/1989 | France | 280/259 |

Primary Examiner—David M. Mitchell
Assistant Examiner—Gary C. Hoge
Attorney, Agent, or Firm—Charles W. Chandler

[57] ABSTRACT

A tricycle (20) disclosed includes a front section (22) and rear section (24). The front section (22) is articulated with respect to the rear section (24) so that the front section (22) can be leaned with respect to the rear section (24) from a normal orientation to lean orientation. A caliper assembly (70) interconnects the front and rear sections (22,24) at the point of articulation and includes arms (72,74) which spread when the front section (22) is leaned with respect to the rear section (24). A biasing member (76) connected to the spreadable arms (72,74) biases the arms together to obviate lean orientation. The front section (22) includes a steerable drive wheel (42) including a hub (44), a central sprocket (34) spaced from the hub (44) and an endless belt (48) interconnecting the hub (44) with the sprocket (48) to provide front wheel drive unaffected by drive apparatus. Rear wheels (86,88) are adjustably spaceable by the movement of frame arms (82,84).

13 Claims, 7 Drawing Sheets

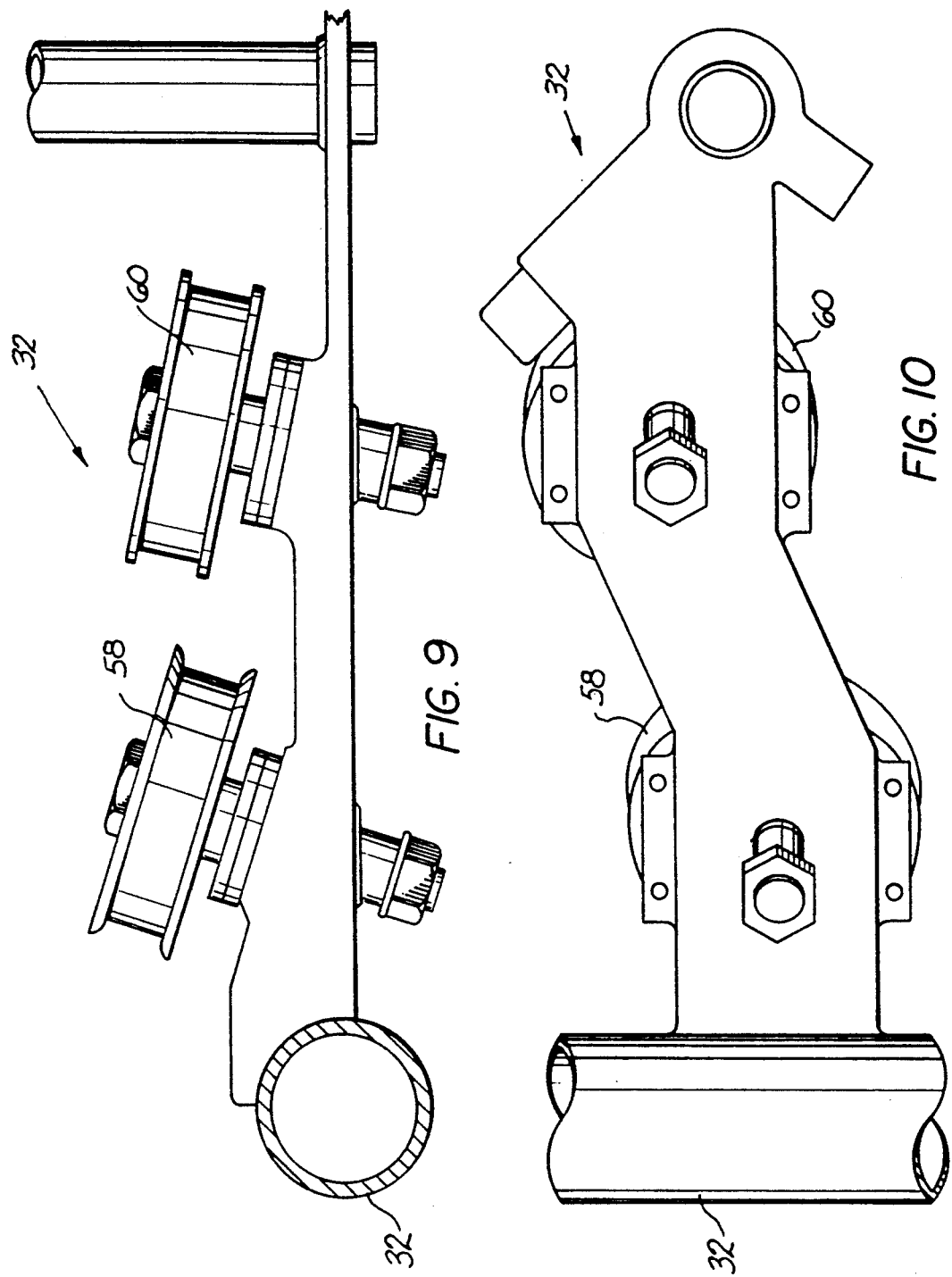

TRICYCLE

TECHNICAL FIELD

This invention relates to wheeled vehicles, and more particularly, to an improved non-tipping tricycle that utilizes improved front-wheel drive, incorporates the turning advantages of a bicycle, and has adjustable rear-wheel spacing.

BACKGROUND ART

Conventional three-wheeled vehicles have two wheels in back and one in front, or alternatively, two wheels in front and one in back. Tricycles with two wheels in back are more traditional and utilize the single wheel in front for steering. Tricycles with two wheels in front often employ the single rear wheel for steering; however, others utilize both the front wheels for steering.

The conventional rigid frame structure of most tricycles tends to cause one of the wheels of the pair of wheels in the direction of a turn to lift off the ground. At high speeds, such tricycles have been known to tip over.

Many elaborate and complicated tricycles have been developed in an effort to avoid this tipping effect. A search by the applicant has revealed the following patents.

U.S. Pat. Nos. 4,740,004; 4,634,137; and 3,561,778 disclose tricycles with two front wheels utilizing parallel bar linkage to allow the frame and front wheels to bank upon turning.

U.S. Pat. Nos. 4,132,435; 3,958,814; 3,836,177; and Design U.S. Pat. No. 290,451 disclose tricycles with two front wheels utilizing transverse front axles and means to allow the frame to tilt relative to the front axle.

U.S. Pat. No. 4,360,224 discloses another tricycle having two front wheels. These wheels are mounted on a suspension assembly which is mounted on a longitudinally extending shaft connected to the frame.

U.S. Pat. No. 3,937,486 discloses a tricycle having two rear wheels wherein the frame is rotatable upon a solid rear axle or wherein a pair of independent rotatably mounted axles prevent the rear wheels to be directed in the direction of turn.

U.S. Pat. No. 3,799,565 discloses a recreation vehicle which in one embodiment is a tricycle having a linkage assembly that allows a pair of rear wheels to be tilted as the tricycle is turned.

Conventional tricycles typically utilize the single wheel, be it in front or rear, as the driven wheel. When the tricycle is driven by the single rear wheel, the forward propelling forces are not in the direction of movement of the tricycle during turning. Although this is overcome in the single front wheel driven tricycles, therein the driving apparatus is mounted on the front end of the tricycle which adversely affects steering.

DISCLOSURE OF INVENTION

An object of the present invention is to provide an improved tricycle having a single front wheel that has less tendency to tip during turning.

Another object of the invention is to provide a tricycle having an articulated frame that incorporates the turning characteristics of a bicycle into the tricycle design.

Still another object of the invention is to provide a tricycle having an articulated frame that includes a seat biased vertically so that after turning, the tricycle occupant is assisted upwardly.

A further object of the invention is to provide a tricycle or other wheeled vehicle that has improved front-wheel drive unaffected by driving apparatus.

A still further object of the invention is to provide a tricycle with adjustable rear-wheel spacing.

In carrying out the above objects and other objects of the invention, an improved tricycle constructed in accordance with the present invention comprises a front frame section including a main frame section having a seat, drive apparatus, head tube, and a steering fork assembly rotatably mounted on the head tube. A front wheel is mounted on the fork assembly.

A rear section including a pair of frame arms, on which a pair of rear wheels is mounted, is pivotally coupled to the front frame section so that the front section pivots, from a normal orientation to a lean orientation, relative to the rear section. A caliper interconnects the front and rear sections at the point of articulation. The caliper includes arms which spread when the front bicycle section is leaned to a lean orientation. The caliper includes a biasing element connected to the spreadable arms that bias the arms together to obviate the lean orientation and return the front section to the normal orientation.

In one embodiment of the invention, the tricycle, or any other wheeled vehicle, includes a front steerable drive wheel including a hub having an axis. An endless belt driven by the drive apparatus interconnects the hub and drive apparatus for driving the front wheel to propel the tricycle.

In another embodiment of the invention, the pair of frame arms are pivotal on the rear section to allow the spacing of the rear wheels to be adjusted. An adjustable hub portion mounted on each frame arm allows the angular position of the rear wheels with respect to the frame arms to be adjusted to establish and maintain parallel rotation of the rear wheels.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 9 is a detailed view taken along line F in FIG. 4 illustrating additional idler guide pulleys mounted on the fork assembly over which the endless belt is communicated to and from the front wheel hub;

FIG. 10 is a detailed view taken along line G in FIG. 5 illustrating an elevational view of the idler guide pulleys of FIG. 9.

BEST MODE FOR CARRYING OUT THE INVENTION

Figure 1:
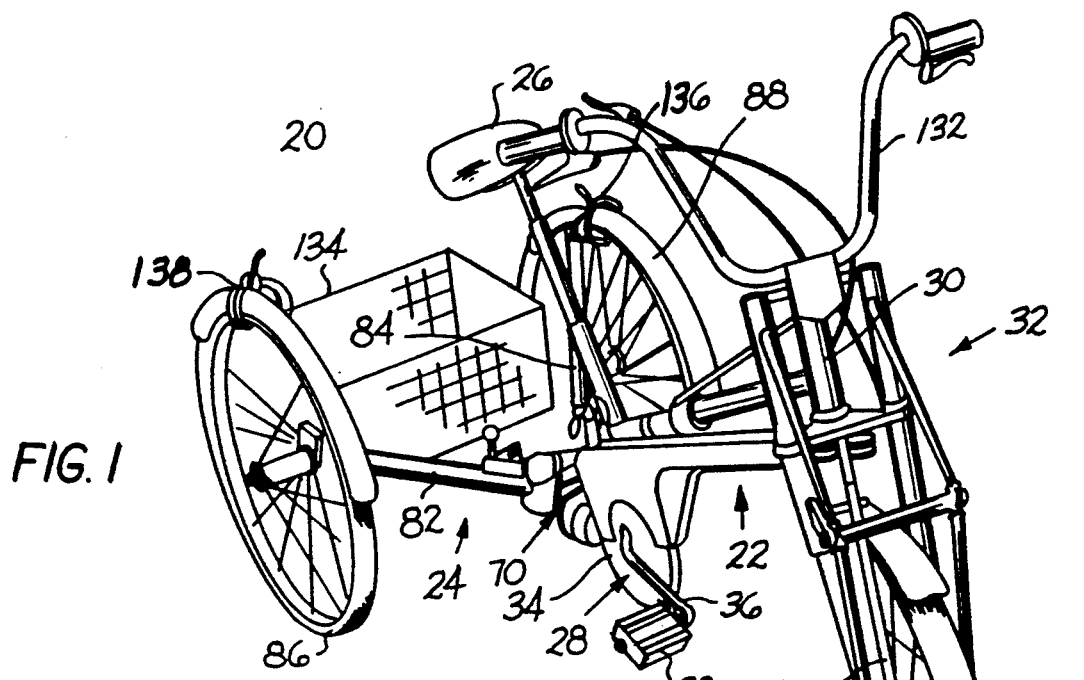
FIG. 1 is a perspective view a tricycle having front wheel drive, articulated frame and adjustably spaceable rear wheels illustrating the rear wheels in spaced orientation, the tricycle constructed in accordance with the present invention.

Referring to FIG. 1 of the drawings, an improved tricycle constructed in accordance with the present invention is generally indicated by reference numeral 20 and incorporates the turning characteristics of a bicycle into a tricycle design as hereinafter more fully described. The tricycle 20 also incorporates an improved front wheel drive arrangement wherein the steering of the tricycle 20 is unaffected by any drive apparatus. As is more fully hereinafter described, the tricycle 20 also incorporates an adjustable rear-wheel spacing feature which allows the tricycle to be easily stored and transported and also allows the tricycle to function as a quasi-bicycle.

Figure 2:
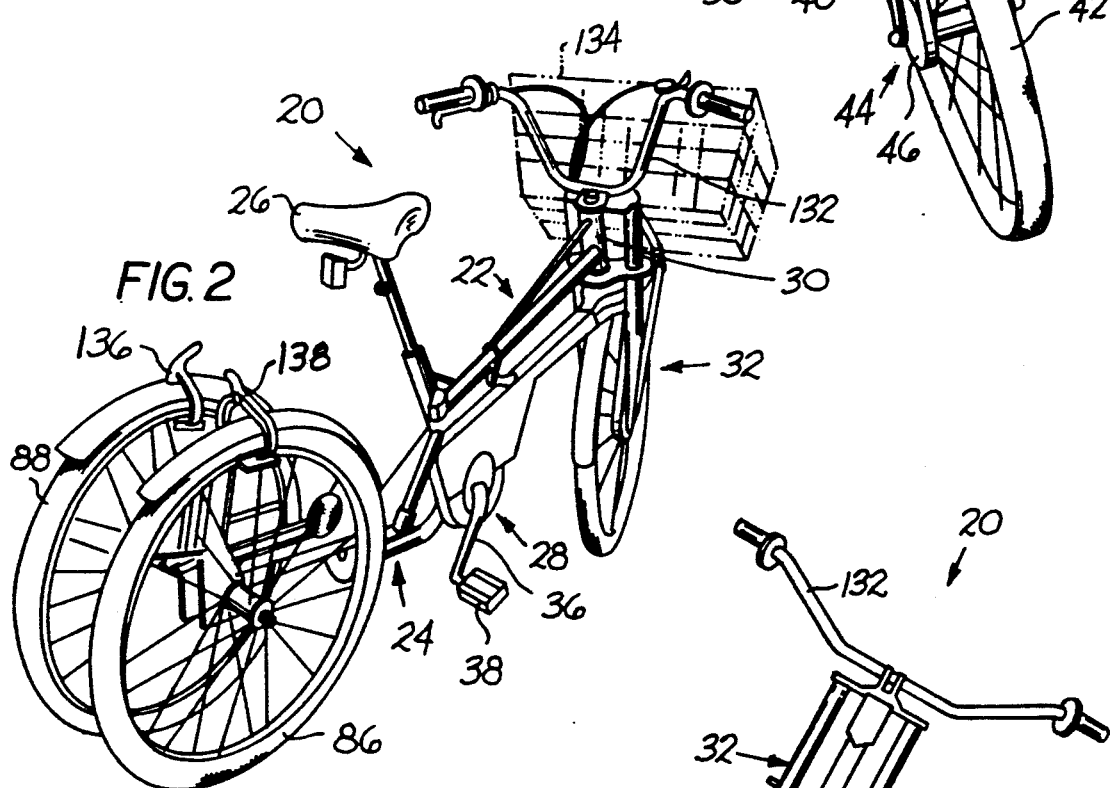
FIG. 2 is a perspective view of the tricycle of FIG. 1 illustrating the rear wheels in collapsed orientation.
Figure 3:
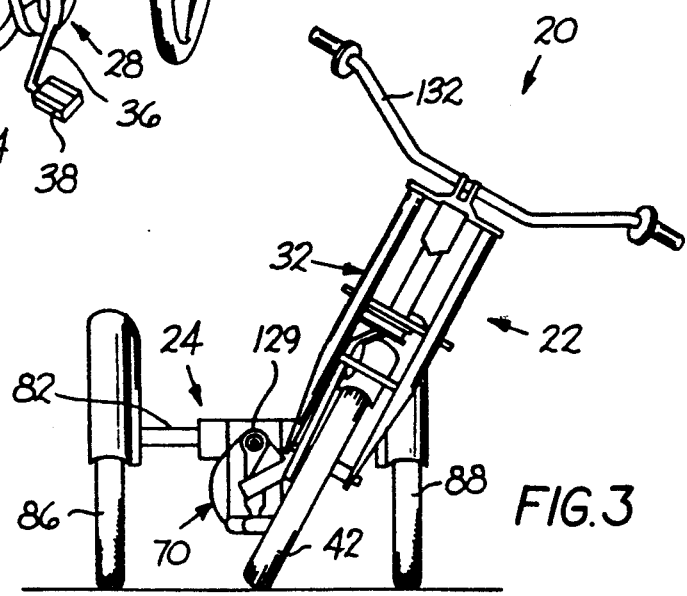
FIG. 3 is a front elevational view of the tricycle illustrating a front section in a lean orientation with respect to a rear section and a caliper assembly at the point of articulation.

As shown in FIGS. 1 through 5, the tricycle 20 includes a front section 22 and a rear section 24. The front section 22 is articulated with respect to the rear section 24 so that the front section can be leaned with respect to the rear section, as illustrated in FIG. 3, from a normal orientation illustrated in FIGS. 1 and 2, to a lean orientation as illustrated in FIG. 3. The front section includes a seat 26, pedal drive apparatus 28, a head tube 30 and a front fork assembly 32. The pedal drive apparatus 28 includes a drive sprocket 34, pedal arms 36, and pedals 38. A timing pulley or "V" pulley 40 is mounted on the sprocket 34.

Fork assembly 32 mounts a front steerable, powered, ground wheel 42 that has a hub 44 on which a timing pulley 46 is mounted. An endless drive belt 48 interconnects sprocket 34 with hub 44 to drive the front ground wheel 42 by rotating the pedal arms 36. The endless belt 48 is preferably a timing belt, or notched belt such as a Dayco Synchro-Cog timing belt, although a conventional V-belt can also be used. A plurality of idler pulleys, 50, 52, 54, 56, 58, and 60 guide the endless belt between the sprocket 34 and hub 44. The individual pulleys are better shown in FIGS. 8, 9 and 10.

Figure 4:
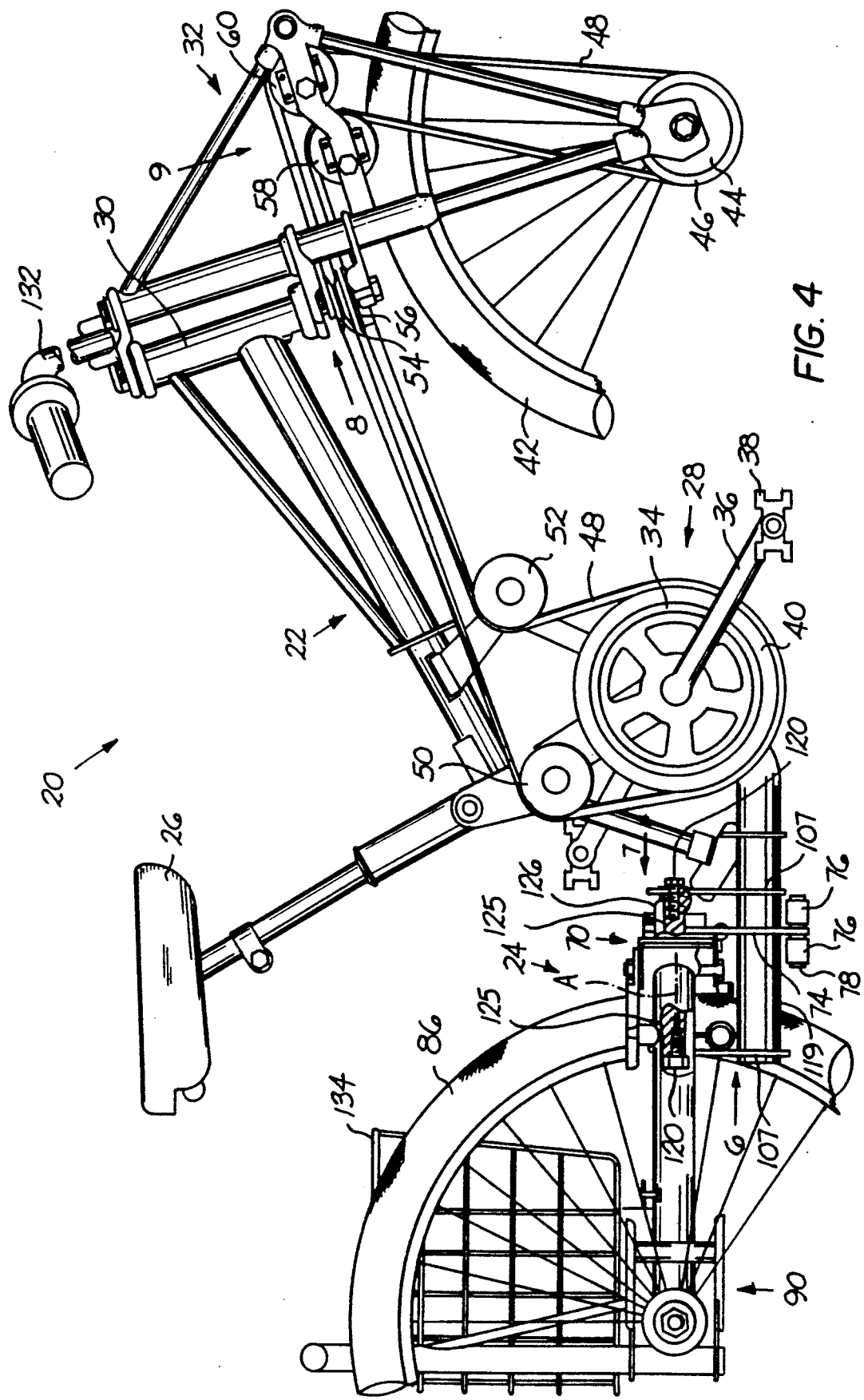
FIG. 4 is a side elevational view of the tricycle illustrating a pedal drive sprocket, an endless belt, a front wheel hub and a caliper assembly.

As shown in FIG. 4, a clevis assembly 105 interconnects the front and rear sections 22,24, for rotary motion around an articulation axis A located directly below the tricycle seat 26.

Figure 7:
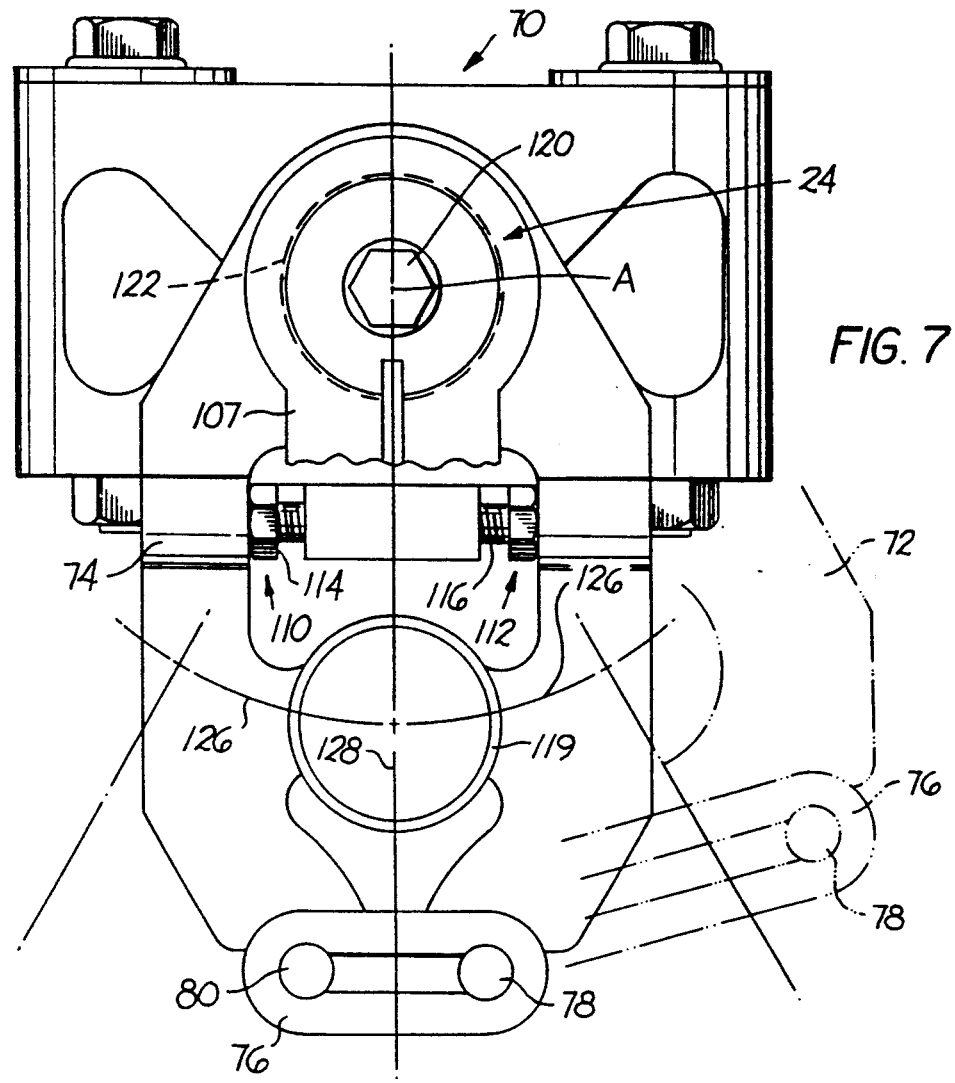
FIG. 7 is a detailed view taken along line D in FIG. 4 illustrating the point of articulation between the front and rear sections as viewed from the front, the caliper assembly that interconnects the front and rear sections, arms which spread when the front section is leaned relative to the rear section and a biasing member that biases the arms together to obviate the lean orientation.
Figure 11:
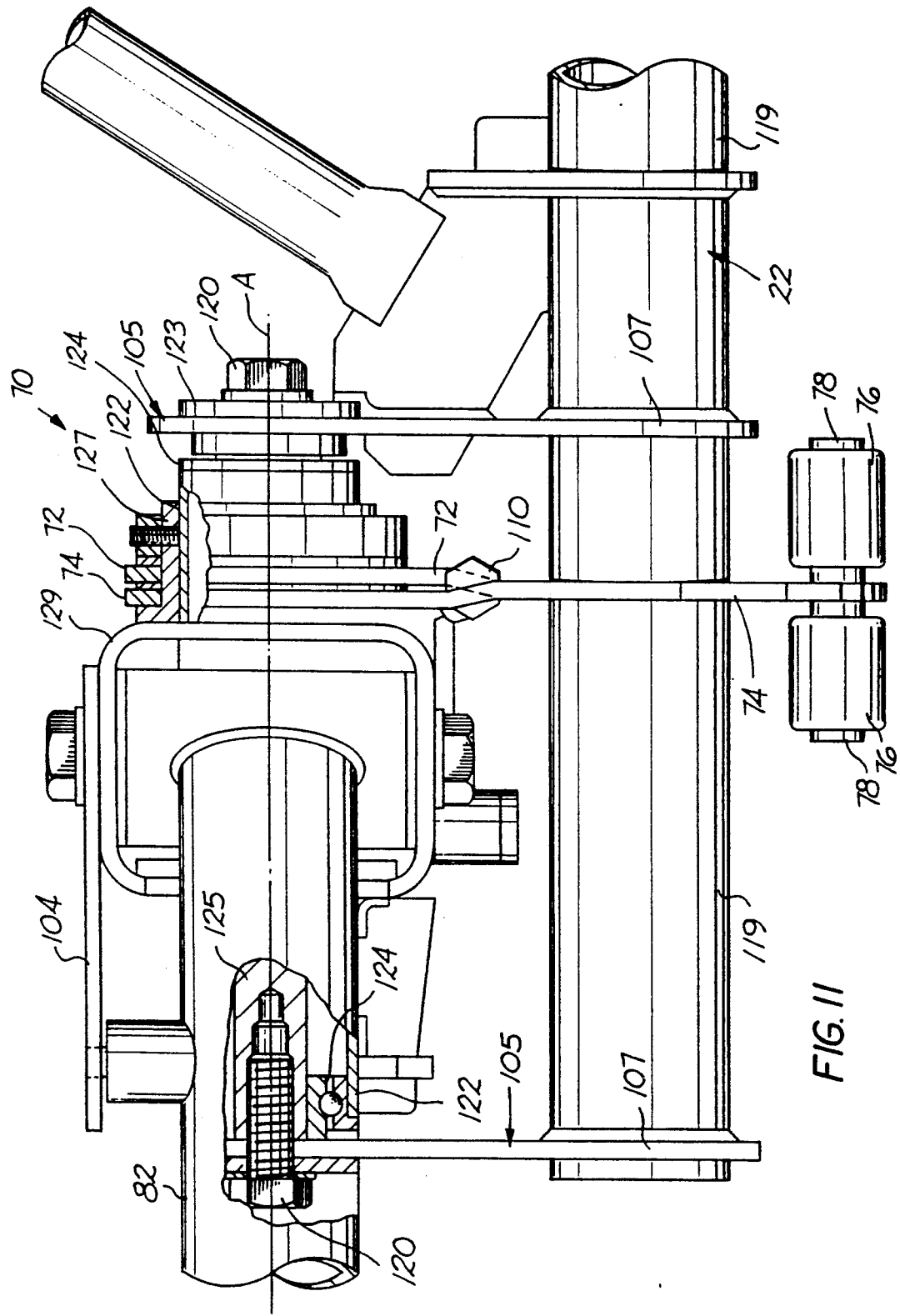
FIG. 11 is an enlarged detailed view taken along line H in FIG. 5 illustrating the caliper assembly interconnecting the front and rear frame sections.

Referring to FIGS. 4, 7 and 11, the articulated joint (clevis assembly 105) between the front and rear sections of the tricycle comprises a horizontal tubular frame element 119 forming part of front section 22, and a tubular housing 122 forming part of the rear section 24. Two flat suspension plates 107, 107 extend upwardly from tubular frame element 119 at the front and rear ends of tubular housing 122. Each end of housing 122 supports an anti-friction bearing 124 that is suitably mounted on a shaft 125 extending axially within housing 122. Each suspension plate 107 is affixed to an end of shaft 125 by a bolt 120 that is screwed into a threaded hole in the shaft end surface. Shaft 125, together with the two plates 107, constitutes a suspension mechanism for rotatably suspending tubular frame element 119 from housing 122.

FIG. 7 shows tubular frame element 119 in its normal position located directly below housing 122. During a tricycle turning event, tubular frame element 19 swings to the left or to the right in an arc 126 around axis A of housing 122. Thus, front section 22 of the tricycle can lean around axis A (to the left or right) as the rider's weight shifts during a turning maneuver.

A caliper means 70, mounted on the forward end of tubular housing 122, squeezes tubular frame element 119 when frame element 199 moves in arc 126 about housing 122. The caliper means includes arms 72,74 which spread as illustrated in FIG. 7 as the front section 22 is leaned with respect to the rear section 24. Caliper means 70 also includes biasing means 76 which bias the arms 72 and 74 together to obviate the lean orientation and return the front section 22 to the normal orientation with respect to the rear section 24. As illustrated, biasing means 76 comprising two parallel latex rubber bands which fits over posts 78 and 80 on arms 72 and 74. Although the latex rubber is a preferred biasing means 76, other materials or apparatus which exhibit elasticity such as a spring can be utilized.

Figure 5:
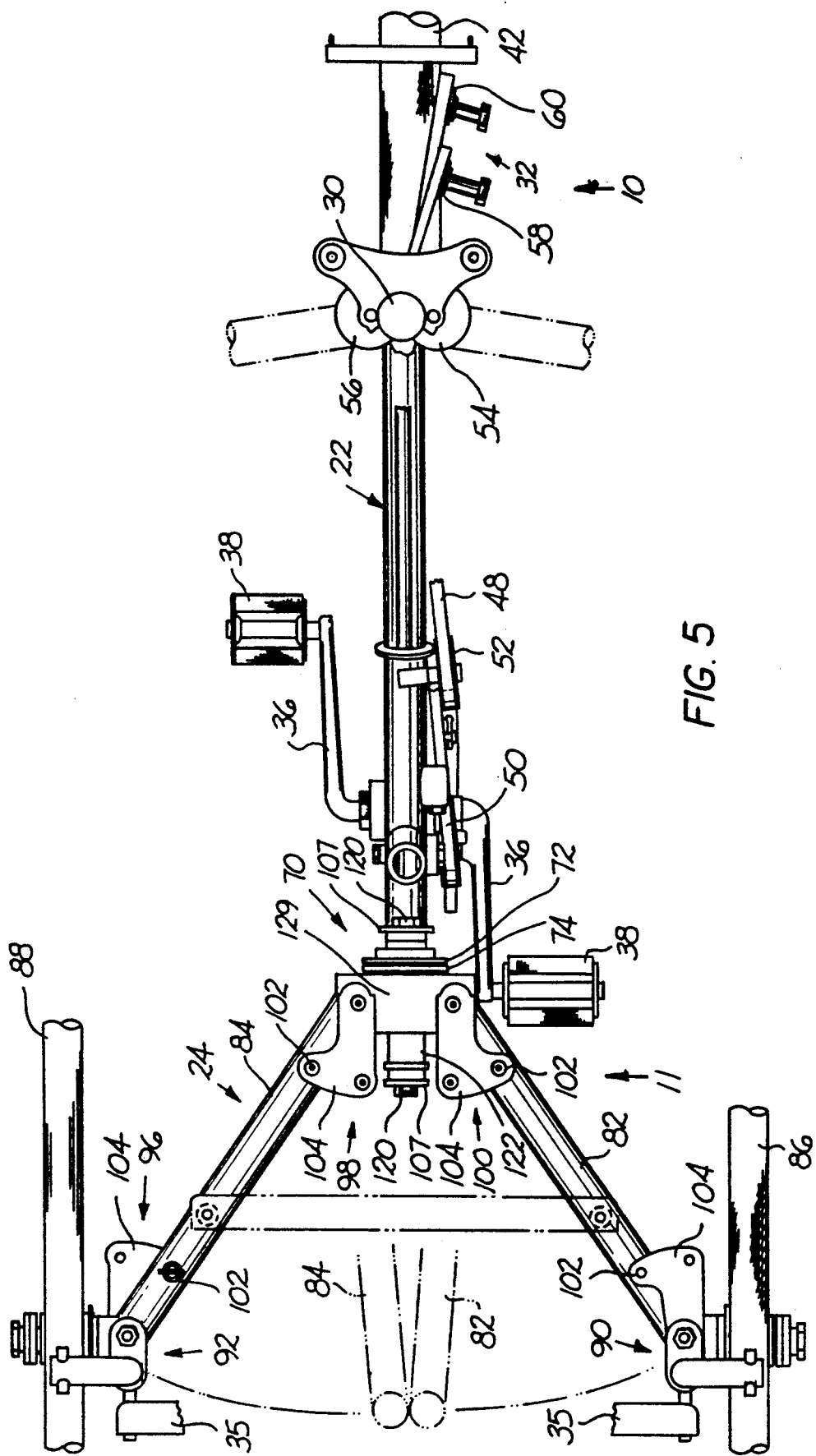
FIG. 5 is a plan view of the tricycle illustrating pivotal frame arms and adjustable hub portions on the rear section.

With further reference to FIGS. 1-5, the rear section 24 includes a pair of frame arms 82 and 84 that are pivotably mounted on a bracket structure 129 attached to housing 122, such that arms 82 and 84 can swing in a generally horizontal plane to allow adjustable spacing of rear wheels 86. As illustrated in FIG. 5, frame arms 82 and 84 include adjustable hub portions 90 and 92 that allow the inclination of the rear ground wheels 88,86 with respect to the frame arms 82,84 to be varied to establish and maintain parallel rotation of the rear wheels as the frame arms are pivoted to adjust the spacing of the rear wheels. Fasteners 94, 96, 98, and 100 illustrated as a conventional detent pin 102 and apertured plate 104 assembly fasten the arms 82,84 and hub portions 90,92 in their adjusted positions. A tie bar 35 (FIG. 5) can be extended between arms 82 and 84 to rigidify the rear wheel support system.

Figure 6:
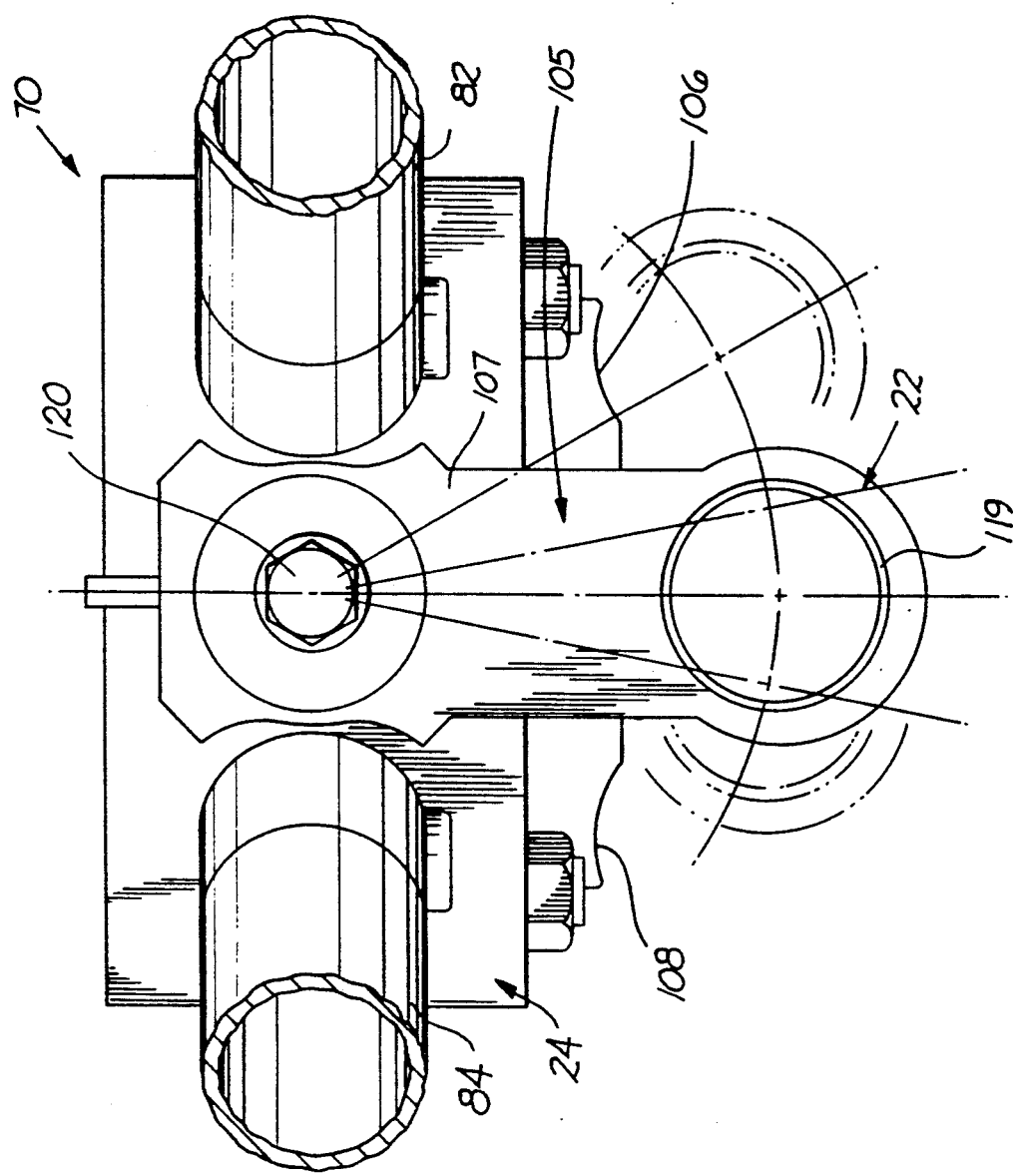
FIG. 6 is a detailed view taken along line C in FIG. 4 illustrating the point of articulation between the front and rear frame sections as viewed from the rear, the pivotal attachment between the front and rear frame sections and stops which control the lean orientation.

FIG. 6 illustrates the point P of articulation between the front section 22 and rear section 24. Point P coincides with aformentioned axis A. The aforementioned clevis assembly 105 mounted on tubular frame element 119 of the front section 22 provides the pivotal connection. Stops 106 and 108 limit the lean orientation of the front section with respect to the rear section.

FIG. 7 illustrates arms 72 and 74 of caliper means 70 and vertical adjustable stops 110 and 112 which utilize bolts 114 and 116 to adjust the spacial relationship between arms 72 and 74.

Each arm 74 or 72 comprises a flat plate having an upper annular portion thereof encircling a sleeve bearing 127 that is mounted on the external surface of housing 122, such that each arm is rotatable around the housing axis A. Adjustable stops 114 and 116 are provided to limit arcuate motion of arms 74 and 72 toward the central vertical plane 128 passing through rotation axis A; however, each arm 74 and 72 can individually swing away from the central plane 128, as shown in dashed lines in FIG. 7.

Resilient bands 76 tend to pull the displaced arm (72 or 74) back toward the full line position (FIG. 7), thereby exerting a biasing effect on tubular frame element 119.

Figure 8:
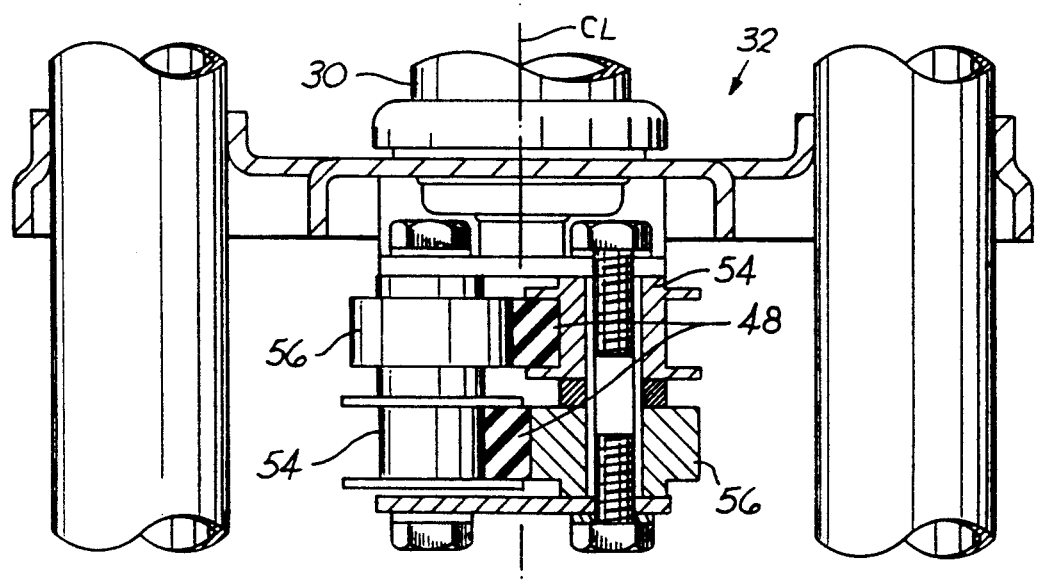
FIG. 8 is a detailed view taken along line E in FIG. 4 illustrating idler pulleys on the center line of a fork assembly and twisted at 90 degrees relative to the drive sprocket and hub to twist the endless belt and communicate the belt through the center line of the fork assembly.

With reference to FIG. 8, idler pulleys 54 and 56 are mounted on either side of the center line CL, in a diametrically opposed fashion, of the fork assembly 32 or about the longitudinal axis of the head tube 30. Idler pulleys 54 and 56 twist endless belt 48 ninety degrees to pass the belt through the center line CL of the head tube 30. This results in the belt 48 having no effect on the steering of the fork assembly 32. As shown in FIG. 8, each pulley 54 is grooved, whereas each pulley 56 is smooth-surfaced, whereby belt 48 is trapped between the pulley edge surfaces.

FIGS. 9 and 10 of the drawings illustrate idler pulleys 58 and 60 which are also mounted on fork assembly 32 and which direct and reorientate the endless belt 48 to and from hub 44 on front wheel 42.

FIG. 11 of the drawings illustrates in greater detail an axis A of articulation of the front section 22 and rear section 24, clevis assembly 105 and caliper means 70 which interconnects the frame sections as hereinabove described.

With further reference to FIGS. 1-3 of the drawings, the tricycle 20 includes conventional handle bars 132, and a detachable wire basket 34. In a preferred embodiment of the invention, the hub 44 of front wheel 42 is a three-speed hub such as that described in U.S. Pat. No. 3,670,856. Tricycle 20 also includes conventional caliper brakes 36 on both rear wheels 86 and 88. Front wheel 42 braking is accomplished through reversing the rotation of pedal apparatus 28 and the features of hub 44.

With reference again to FIG. 3, it becomes apparent that the center of gravity of the tricycle 20 with its driver is moved in the direction of the center of a turning radius when turning. This makes tricycle 20 especially stable when cornering. Also, when the tricycle is traveling in a straight course over rough terrain surfaces, the rider will remain in an essentially upright vertical position because rear ground wheels 86 and 88 are independent of the front frame section 22. This feature enables the tricycle to maneuver over rough terrain without tipping or loss of ground contact at the rear wheels.

While the best mode for carrying out the invention has been described in detail, those familiar with the art to which this invention relates will recognize various alternative designs and embodiments for practicing the invention as defined by the following claims.

What is claimed is:
1. A tricycle comprising:
a tricycle frame including a pair of rear idler wheels, pedal drive apparatus having a sprocket, and a head tube having a longitudinal axis on the front of said frame;
a steering fork assembly attached to said head tube for rotation about said longitudinal axis; said assembly including a front driven wheel having a hub;
said fork assembly also including a pair of diametrically opposed idler guide pulleys mounted on either side of said longitudinal axis; each idler wheel having an axis of rotation parallel to said longitudinal axis; and
an endless belt being driven by said drive apparatus and communicated over said guide pulleys through the longitudinal axis for interconnecting said driven front wheel hub with said sprocket to propel said tricycle.

2. A tricycle comprising:
a front bicycle frame portion including a main frame section having a seat, pedal drive apparatus, head tube, a steering fork assembly rotatably mounted on said head tube, and a front wheel mounted on said fork assembly;
a rear section including a pair of adjustable frame arms pivotal on said rear section, an adjustable hub portion mounted on each frame arm, a rear wheel mounted on each said adjustable hub portion, and a fastener adjustably locking said arms in a selected pivotal position to vary the spacing between the rear wheels; said hubs being adjustable to vary the inclination of said rear wheels with respect to said arms thereby to establish parallel rotation of said rear wheels.

3. A tricycle comprising:
a front section and a rear section; said front section being articulated with respect to said rear section so that said front section can be leaned with respect to said rear section from a normal orientation to a lean orientation;
caliper means interconnecting said front and rear sections at the point of articulation; said caliper means including two arms which spread when said front section is leaned with respect to said rear section; said caliper means including biasing means connected to said spreadable arms and biasing said arms together to obviate said lean orientation and return said front section to the normal orientation with respect to said rear section;
said rear section of the tricycle comprising a horizontal tubular housing means (122) extending in a front-to-rear direction;
said front section comprising a tubular frame element extending in a front-to-rear direction below said tubular housing means;
a shaft (125) extending through the tubular housing means;
suspension means (107) extending downwardly from said shaft to said tubular frame element; and
said caliper arms being rotatably mounted on said tubular housing means for rotary motion around the housing means axis; said arms extending downwardly from the tubular housing to grip opposite side surfaces of said tubular frame element.

4. The tricycle of claim 3, wherein said caliper arms are located between the two suspension members.

5. The tricycle of claim 3, wherein said biasing means comprises a post extending from each caliper arm below said tubular frame element, and a resilient stretchable band (76) trained around the respective posts to bias the front section of the tricycle toward said normal orientation from a leaned position.

6. The tricycle of claim 3, wherein the suspension means (107) comprises a flat plate extending in a plane normal to the attached tubular frame element.

7. A tricycle comprising:

a front bicycle frame section including a main frame section having a human support seat, pedal drive apparatus, head tube, and a steering fork assembly rotatable mounted on said head tube;

a front ground wheel mounted on said fork assembly;

a rear frame section including a pair of frame arms and a pair of rear ground wheels mounted on said frame arms; and a coupling including a caliper means pivotally connecting said front bicycle frame section and rear frame section so that said front bicycle section is articulated with respect to said rear section; said caliper means, including two arms which spread when said front section is leaned with respect to said rear section; said caliper means including biasing means connected to said spreadable arms and biasing said arms together to obviate leaning and to return said front bicycle section to a normal orientation with respect to said rear portion;

said rear frame section comprising a horizontal tubular housing (122) extending in a front-to-rear direction; said main frame section comprising a tubular frame element (119) extending in a front-to-rear direction below said tubular housing, a shaft (125) extending through the tubular housing, and two suspension members (107) extending downwardly from opposite ends of said shaft to said tubular frame element;

said caliper arms being rotatably mounted on said tubular housing for rotary motion around the housing axis; said arms extending downwardly beyond the tubular housing to grip opposite side surfaces of said tubular frame element.

8. The tricycle of claim 7, wherein said tubular housing is located directly below said seat, whereby the weight of the human rider is exerted substantially directly downwardly normal to the housing axis.

9. The tricycle of claim 7, wherein said front ground wheel has a driving hub thereon; said steering fork assembly comprising an upright head tube (30) having an axis, and upper and lower pairs of diametrically opposed guide pulleys mounted alongside said head tube so that each defines a guide opening located on the head tube axis; each pulley having an axis of rotation parallel to the head tube axis; said pedal drive apparatus comprising a pedal-driven wheel (40), and an endless drive belt trained around said pedal-driven wheel and said driving hub, said endless belt extending through the guide openings defined by said opposed guide pulleys, whereby the tricycle front wheel can be driven without interfering with the steering action.

10. A tricycle comprising:
a front section and a rear section; said front section being articulated with respect to said rear section so that said front section can be leaned with respect to said rear section from a normal orientation to a lean orientation; said front section including a single steerable powered ground wheel including a hub having a axis, a central sprocket having an axis spaced from said hub axis and an endless belt means interconnecting said hub with said sprocket, said rear section including a pair of non-powered ground wheels; and caliper means interconnecting said front and rear sections at the point of articulation; said caliper means including two caliper arms which spread when said front section is leaned with respect to said rear section; said caliper means including biasing means connected to said spreadable arms and biasing said arms together to obviate said lean orientation and return said front section to the normal orientation with respect to said rear portion;

said rear section comprising a hollow housing (122) having a horizontal axis extending in a front-to-rear direction; said front section comprising a tubular frame element (119) extending in a front-to-rear direction below said housing, a shaft (125) extending through the hollow housing on the housing axis, and two suspension members (107) extending downwardly from opposite ends of said shaft to said tubular frame element;

said caliper arms being rotatably mounted on said housing for rotary arcuate motion in a plane normal to the housing axis; said arms extending downwardly to grip opposite side surfaces of said tubular frame element.

11. The tricycle of claim 10, and further comprising oppositely facing stop means (110, 112) carried by said hollow housing for limiting the rotary arcuate motion of said caliper arms toward a vertical plane coincident with the housing horizontal axis, whereby during arcuate motion of either caliper arm away from said vertical plane, the other caliper arm is maintained in a motionless condition in which said other arm acts an anchorage for said biasing means.

12. The tricycle of claim 11, wherein each caliper arm has a post thereon located below the tubular frame element; said biasing means comprising a resilient stretchable band (76) trained around the respective posts.

13. A tricycle comprising:
a front section and a rear section; said front section being articulated with respect to said rear section so that said front section can be leaned with respect to said rear section from a normal upright orientation to a lean orientation;

said front section including a single steerable drive wheel comprising a hub having a transverse axis, a central sprocket having a transverse axis spaced from said hub axis and an endless belt means interconnecting said hub with said sprocket;

said rear section including a pair of rearwardly divergent frame arms, and a rear ground wheel mounted on each frame arm;

an articulation joint connecting said front and rear sections together, said articulation joint comprising a shaft and a shaft housing having a horizontal rotational axis extending in a front-to-rear direction; said shaft being rigidly connected to one of said sections, and said shaft housing being rigidly connected to the other section, whereby the front section has a lean capability;

said front section comprising a frame element extending in a front-to-rear direction below said shaft housing; and caliper means interconnecting said front and rear sections at said articulation joint; said caliper means comprising two spreadable arms rotatably mounted on said rear section for swinging movements transverse to the shaft housing axis; said caliper arms extending downwardly from the articulation joint to grip opposite side surfaces of said frame element; and resilient biasing means drawing said arms toward each other so that said arms are enabled to restore said front section of said tricycle to the normal upright orientation.

* * * * *